(12) United States Patent
Assadi et al.

(10) Patent No.: US 9,530,014 B2
(45) Date of Patent: Dec. 27, 2016

(54) METHOD AND A DEVICE FOR MAKING A COMPUTER APPLICATION SECURE

(71) Applicant: ORANGE, Paris (FR)

(72) Inventors: Houssem Assadi, Caen (FR); Loïc Habermacher, Paris (FR); Erwan Louet, Fougeres (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/367,196

(22) PCT Filed: Dec. 18, 2012

(86) PCT No.: PCT/FR2012/052979
§ 371 (c)(1),
(2) Date: Jun. 19, 2014

(87) PCT Pub. No.: WO2013/093330
PCT Pub. Date: Jun. 27, 2013

(65) Prior Publication Data
US 2015/0007339 A1    Jan. 1, 2015

(30) Foreign Application Priority Data

Dec. 20, 2011 (FR) .................................... 11 62036

(51) Int. Cl.
*G06F 21/60* (2013.01)
*G06F 21/44* (2013.01)

(52) U.S. Cl.
CPC ............. *G06F 21/604* (2013.01); *G06F 21/44* (2013.01); *G06F 2221/031* (2013.01)

(58) Field of Classification Search
CPC ... G06F 21/44; G06F 21/604; G06F 2221/031
(Continued)

(56) References Cited

U.S. PATENT DOCUMENTS 6,950,949 B1  9/2005  Gilchrist
7,552,467 B2 *  6/2009  Lindsay ........................... 726/5
(Continued)

FOREIGN PATENT DOCUMENTS

FR          2 893 732        5/2007
GB          2 434 662 A      8/2007
WO    WO 2007/060322 A2     5/2007

OTHER PUBLICATIONS

Jesin's Blog Javascript Reload Image http://jesin.tk/javascript-reload-image/ Jan. 22, 2011.*

(Continued)

*Primary Examiner* — Kambiz Zand
*Assistant Examiner* — Benjamin Kaplan
(74) *Attorney, Agent, or Firm* — Knobbe Martens Olson & Bear LLP

(57) ABSTRACT

In one embodiment, a security method for making secure a computer application being executed on a terminal is disclosed. In one embodiment the security method comprises obtaining information to the effect that the application is about to invite a user of the terminal to input data, accessing a binary file representative of a secret image known to the user of the terminal, the binary file being stored in a secure element of the terminal, constituting a complex image in the secure element, the complex image being obtained from the secret image and from dynamic data that is inaccessible to said terminal, and displaying the complex image on a screen of the terminal.

15 Claims, 2 Drawing Sheets

(58) Field of Classification Search
USPC .......................................................... 726/26
See application file for complete search history.

(56) References Cited

U.S. PATENT DOCUMENTS

| | | |
|---|---|---|
| 2004/0177280 A1* | 9/2004 | Maruyama et al. .......... 713/202 |
| 2007/0043681 A1 | 2/2007 | Morgan et al. |
| 2008/0209223 A1 | 8/2008 | Nandy et al. |
| 2011/0119484 A1 | 5/2011 | Jallad et al. |

OTHER PUBLICATIONS

International Search Report mailed Apr. 4, 2013, for International Application No. PCT/FR2012/052979 filed Dec. 18, 2012.
International Search Report and Written Opinion mailed Apr. 4, 2013, for International Application No. PCT/FR2012/052979 filed Dec. 18, 2012.

* cited by examiner

METHOD AND A DEVICE FOR MAKING A COMPUTER APPLICATION SECURE

RELATED APPLICATIONS

This application is the U.S. National Phase of Application No. PCT/FR2012/052979 entitled "METHOD AND DEVICE FOR MAKING A COMPUTER APPLICATION SECURE" filed Dec. 18, 2012, which designated the United States, and which claims the benefit of French Application No. 1162036 filed Dec. 20, 2011.

BACKGROUND OF THE INVENTION

The present invention lies in the field of making secure a computer application that is being executed on a terminal.

More precisely, the invention lies in the field of making secure computer applications that ask a user to input sensitive data, e.g. a password or a personal identification number (PIN).

The computer application in question is created by an application supplier. The invention seeks to prevent a fraudulent application created by a dishonest third party obtaining such data when it is input by the user.

In this context, a particular problem has been identified in which a fraudulent application that has been introduced into a terminal unbeknown to the user runs as a background task on the terminal and puts a fraudulent input display on the input display of the pirated application, the fraudulent display being an exact copy of the pirated input display and being intended to discover the data that is input by the user.

In the present state of the art, security mechanisms are known that seek to combine the display for inputting sensitive data with an image that is known to the user.

Unfortunately, the security provided by that mechanism is not sufficient since the applications supplier cannot guarantee the authenticity of the known image.

The invention proposes a security method and a terminal implementing the method that correct certain vulnerabilities of the above-mentioned prior art method.

OBJECT AND SUMMARY OF THE INVENTION

More precisely, the invention provides a security method for making secure a computer application being executed on a terminal, the method comprising:
  a step of obtaining information to the effect that the application is about to invite a user of the terminal to input data;
  a step of accessing a binary file representative of a secret image known to the user of the terminal, the binary file being stored in a secure element of the terminal;
  a step of constituting a complex image in the secure element, the complex image being obtained from the secret image and from dynamic data that is inaccessible to the terminal; and
  a step of displaying the complex image on a screen of the terminal.

In corresponding manner, the invention provides a security device for making secure a computer application being executed on a terminal, the method comprising:
  means for obtaining information to the effect that said application is about to invite a user of the terminal to input data;
  means for accessing a binary file representative of a secret image known to the user of the terminal, the binary file being stored in a secure element of the terminal;
  means for constituting a complex image in said secure element, the complex image being obtained from said secret image and from dynamic data that is inaccessible to said terminal; and
  means for displaying said complex image on a screen of the terminal.

Thus, in general manner, as in the above-mentioned prior art, the invention proposes displaying an image known to the user of the terminal on the screen of the terminal in order to reinforce the user's confidence that the computer application being executed on the terminal is an authorized application.

In remarkable manner, and unlike the prior art, the binary file that represents the secret image known to the user is stored in a security element of the terminal. By way of example, the security element may be constituted by a subscriber identity module (SIM) card, a removable medium of the secure digital (SD) card type, or an embedded secure element, or indeed a secure zone of the application processor that is made secure by using security technology incorporated in the processor (e.g. TrustZone technology, trademark registered by ARM Ltd.).

Thus, by storing the secret image in the security element, it becomes very difficult for a fraudulent application to obtain the binary file in order to create a fraudulent display. The invention guarantees the authenticity of the secret image.

Furthermore, unlike the prior art, the image displayed on the screen of the terminal is not merely the secret image known to the user, but a complex image that is obtained from that secret image and from dynamic data that is inaccessible to the terminal. The fact of combining the secret image with dynamic data (in other words the fact of making the secret image variable) considerably increases the entropy of the image displayed on the screen of the terminal, such that even if a fraudulent application does indeed manage to obtain a copy of the displayed image, it would find it very difficult to reconstitute the secret image in order to deceive the user.

The invention is particularly applicable to contactless payment applications, e.g. in compliance with the near field communication (NFC) standard.

In this particular context for use of the invention, the dynamic data may be the amount of a payment transaction.

In general, it is preferable for the dynamic data to be a parameter of the application that is to be made secure.

In accordance with the invention, the dynamic data is inaccessible to the terminal. This means that the applications of the terminal cannot obtain this dynamic data as such, but only the image of the dynamic data as combined with the secret image.

In accordance with the invention, the security method is performed when it has been detected that the application for making secure is about to invite the user of the terminal to input data.

This invitation may be made in various ways.

For example, the invitation may be an audio message inviting the user to input data by voice.

Under such circumstances, as soon as the audio message is detected, the complex image is displayed on the screen of the terminal.

In a particular embodiment of the invention, the invitation is made via an application screen that includes a zone for inputting text data.

In this implementation, security consists in combining the complex image with the display of the application.

This comes close to the prior art solution, but with two major differences, namely:

the secret image is stored in a secure element of the terminal; and the secret image is combined with dynamic data that is inaccessible to the terminal.

The invention can be performed to make secure applications in which the data input by the user is confirmed in an implicit manner.

For example, the invention may be performed in a method in which the user is asked to input a four-digit PIN, with the inputting of the fourth digit serving to confirm that the PIN has been input.

However the invention is preferably applied to applications in which the user is asked to confirm input in explicit manner.

In this implementation, the display takes place before input confirmation is enabled.

The user may thus be asked to confirm that the complex image displayed on the screen of the terminal does indeed correspond to the secret image selected by the user.

It is thus possible to wait for the image to be confirmed before showing buttons to the user suitable for confirming the input.

Two main variants of the invention may be envisaged.

In a first variant, the application to be made secure itself includes means for obtaining the secret image, for constituting the complex image, and for displaying the complex image on the screen of the terminal.

In this embodiment of the invention, it is necessary for the application to be able to access the secure element in order to obtain the secret image and thus constitute the complex image.

However in order to implement this embodiment, it is not essential for the application itself to be executed in the secure element.

In a second variant embodiment, the invention may be implemented by a security application for making some other computer application secure.

In this variant embodiment, all that is required is for the security application to be able to obtain a message from the computer application that is to be made secure to the effect that it is about to invite the user to input data.

The security application then builds up the complex image and sends it to the application that is to be made secure, which in turn displays it on the screen. If, after this display, the user confirms that the secret image has been recognized, then the data input can be confirmed by means of an action on the part of the user.

Such a security application is preferably executed in the secure element.

In a particular embodiment of the invention, the application that is to be made secure is executed at least in part in the secure element. This applies in particular for a payment application in which a man/machine interface (MMI) module runs on the terminal, with the module in charge of payment proper being executed in the secure element.

In a particular application, the various steps of the security method are determined by computer program instructions.

Consequently, the invention also provides a computer program on a data medium, the program being suitable for being performed by a computer, the program including instructions adapted to performing steps of the security method as mentioned above.

In a particular embodiment of the invention, the program further includes instructions for executing at least a portion of the computer application that is to be made secure.

The program may use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may include storage means such as a read only memory (ROM), e.g. a compact disk (CD) ROM, or a microelectronic circuit ROM, or indeed magnetic recording means, such as a floppy disk or a hard disk.

Various solutions may be envisaged.

For example, the data medium may include:

a computer program suitable for performing the security method of the invention, but not the application that is to be made secure; or a computer program suitable for performing both the application that is to be made secure and also the method of the invention; or two independent computer programs, one for performing the computer application that is to be made secure, and the other for performing the method of the invention.

Furthermore, the data medium may be a transmissible medium such as an electrical or optical signal, suitable for being conveyed via an electrical or optical cable, by radio, or by other means. In particular, the program of the invention may be downloaded from an Internet type network.

Alternatively, the data medium may be an integrated circuit in which the program is incorporated, the circuit being adapted to execute or to be used in the execution of the method in question.

The invention also provides a secure element including a device as mentioned above.

In a particular embodiment, the secure element of the invention includes a secure domain that is accessible solely by the computer application to be made secure, with the binary file being stored in this secure domain. The concept of a secure domain may for example be as proposed in the global platform standard and is usually implemented in secure elements such as new generation SIM/USIM cards.

This makes it possible to strengthen the security of the solution, in particular when the secure element includes a plurality of computer applications, each of which thus has access to its own secret image in leaktight manner.

The invention also provides a terminal including a device as mentioned above or a secure element as mentioned above.

In a particular embodiment, the terminal of the invention also includes means, e.g. the operating system of the terminal, suitable for preventing copying of the display on the terminal screen.

This embodiment is particularly advantageous since it also makes it possible to make applications secure against attacks from fraudulent applications capable of detecting that the complex image of the invention is being displayed and of creating a true copy of this image on the fly in order to be able fraudulently to obtain the data input by the user.

BRIEF DESCRIPTION OF THE DRAWINGS

Other characteristics and advantages of the present invention appear from the following description made with reference to the drawings which show an embodiment having no limiting character.

In the figures.

DETAILED DESCRIPTION OF THE INVENTION

Figure 1:
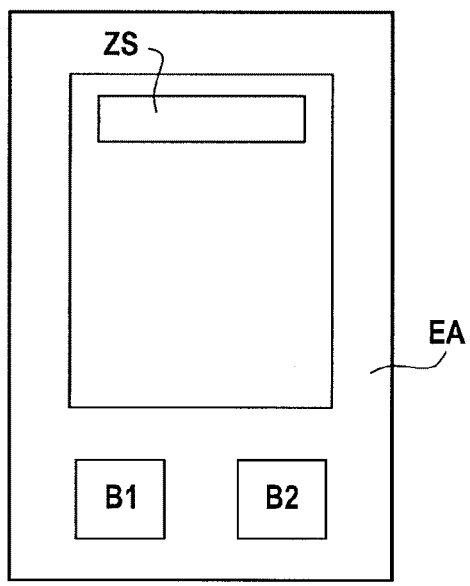
FIG. 1 shows an application screen of an application that can be made secure by the invention.

FIG. 1 shows an application screen display EA of an application that can be made secure by the invention.

This application screen display includes an input zone ZS into which the user may input a secret code or PIN number, and two buttons B1 and B2 for confirming or canceling the data input into the zone ZS.

Figure 2A:
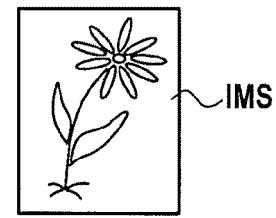
FIGS. 2A and 2B show respective images that are "secret" and "complex" in the meaning of the invention.

FIG. 2A shows an image IMS that is "secret" in the meaning of the invention. It is an image selected by the user of the terminal, this image being for storing in a security element of the terminal.

Figure 2B:
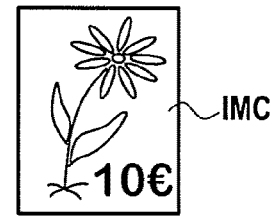

FIG. 2B shows an image that is "complex" in the meaning of the invention.

This complex image is obtained by combining the secret image of FIG. 2 with dynamic data that is inaccessible to the terminal.

In this example, the computer application to be made secure is a payment application and the dynamic data is the amount (10 €) of a transaction that the user is about to confirm by inputting a PIN.

In general, the dynamic data depends on the application being performed on the terminal. It is volatile data that is specific to the current execution of the application. The application given here is the amount of a transaction, in the context of a payment application. Naturally, the invention is not limited to this particular example of dynamic data. Thus, in another implementation, the dynamic data is a photograph of a product to be purchased, a technical characteristic of the product to be purchased which the user can discover independently of reading the mobile terminal, a photograph of the sales person, if face to face, etc.

Figure 3A:
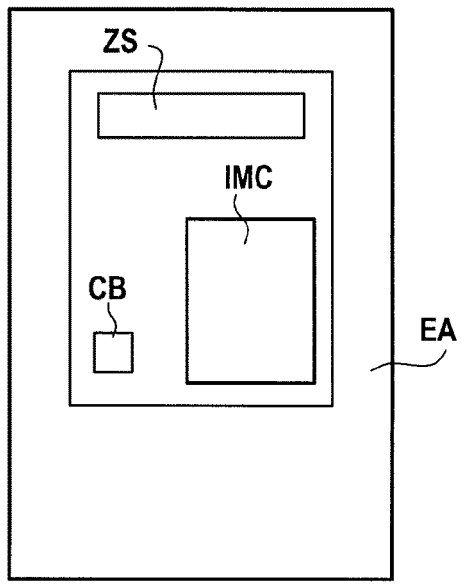
FIGS. 3A and 3B show application screens made secure by the invention.

FIG. 3A shows the application screen display of FIG. 1 combined with the complex image IMC of FIG. 2B.

This screen display is for presenting to the user when the user is to input data.

The user then recognizes the secret image IMS and is therefore reassured that the application displaying the screen is a compliant application.

In accordance with the invention, this secret image IMS is combined with the dynamic data that is constituted in this example by the amount of a transaction, such that it is very difficult for a fraudulent application to reconstitute the complex image. In the example described with reference to FIG. 2B, the combination of the secret image with the dynamic data consists in superposing the dynamic data on the secret image. In other implementations, the combination consists in displaying the dynamic data and the secret image side by side, or in presenting the secret image and the dynamic data in alternation on the screen with a time period that is short, of the order of one second. In general manner, it is possible to envisage any combination of the dynamic data with the secret image providing the user can see in the complex image both the presence of the dynamic data and the presence of the user's own secret image.

In the example of FIG. 3A, a check box CB is shown to the user to ask the user to confirm that the complex image IMS has indeed been recognized before showing the user the button for confirming the data input.

Figure 3B:
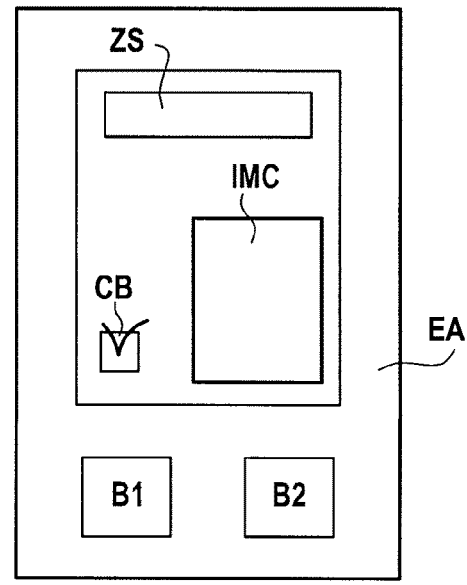

The application screen with its three confirmation buttons is shown in FIG. 3B.

Figure 4:
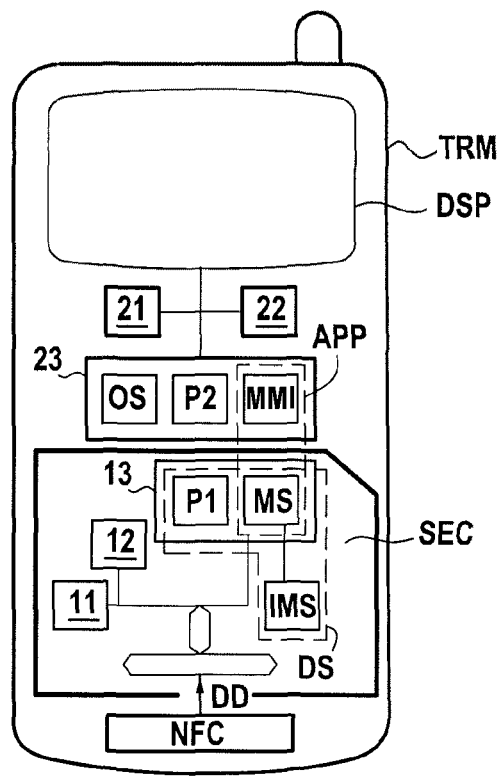
FIG. 4 shows a terminal in a particular embodiment of the invention.

FIG. 4 shows a terminal TRM in accordance with the invention.

The terminal comprises:
- a display screen DSP;
- a processor 21 suitable for performing the conventional functions of a communications terminal;
- a random access memory (RAM) 22;
- a ROM 23 comprising in this example an operating system OS, a program P2 executed by the processor 21 to perform the conventional functions of the terminal, and an MMI module of the application APP that is to be made secure, the MMI module providing the interface between the user and the secure module MS of the application;
- a secure element SEC constituted in this example by a SIM card; and
- an NFC module, this module serving in particular to enable the terminal to carry out payment transactions with a reader that is not shown. More precisely, this communications module enables data to be exchanged, this data that is exchanged constituting transactions between the contactless reader and an application installed in the secure module.

The secure element SEC in this example comprises a processor 11, RAM 12, and ROM 13.

The ROM 13 constitutes a data medium in the meaning of the invention. It includes the secure module MS of the application APP that is to be made secure and a computer program P1 in accordance with the invention. This computer program includes instructions for enabling steps of the security method of the invention to be executed as described below with reference to FIG. 5.

In accordance with the invention, the security method also has a binary file including the secret image IMS of FIG. 2A.

In the presently-described embodiment, this binary file is stored in a secure domain DS specific to the application APP.

The secure element SEC also includes a bus for receiving transaction data, and in particular transaction amounts. More precisely, these amounts are received directly from the contactless reader during a transaction. In particular, they do not pass via a memory of the terminal TRM. In this sense, these amounts, which constitute the dynamic data, are inaccessible to the terminal TRM.

These transaction amounts constitute dynamic data suitable for being combined with the security image IMS for presentation to the user of the terminal.

Figure 5:
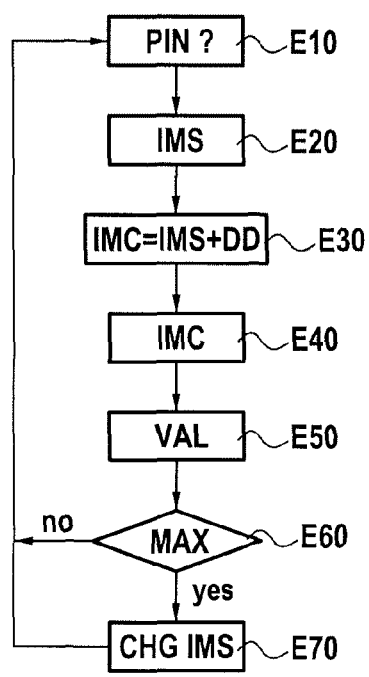
FIG. 5 is a flow chart showing the main steps of a security method in accordance with a particular implementation of the invention.

With reference to FIG. 5, there follows a description of a particular implementation of the invention.

During a step E10, the processor 11 of the secure element SEC obtains information to the effect that the application APP is about to invite the user of the terminal TRM to input data.

This step may consist in receiving a particular message from the secure module MS of the payment application APP.

During a step E20, the processor 11 accesses the binary file stored in the secure element DS in order to obtain the secret image IMS known to the user of the terminal.

During a step E30, the processor 11 combines this secret image IMS with the dynamic data DD corresponding to the amount of a transaction. It should be observed that the dynamic data DD never leaves the secure element SEC. The dynamic data DD is received via the NFC module that communicates it directly to the secure domain DS in which the application P1 uses it. The data, in the form of an image, is merely combined with the secret image IMS in order to constitute a complex image IMC.

The complex image IMC is shown to the user during a step E40. In this example, the complex image is combined with the application screen display EA of the application APP, as shown in FIG. 3A.

If the user checks the check box CB, this operation is interpreted as meaning that the user has recognized the secret image IMS, and the buttons B1 and B2 are then shown in order to enable the user to confirm or to cancel the input, as shown in FIG. 3B.

It is assumed that the user confirms or "validates" the input of the secret data during a step E50.

In the presently-described implementation, during a step E60, it is verified whether the security image IMS has been read a predetermined number of times MAX.

If it has, the user is invited during a step E70 to change the secret image stored in the security domain DS.

The processor 11, the memories 12 and 13, and the computer program P1 constitute an example of a secure device in the meaning of the invention for making the computer application APP secure, in that they provide:
- means for obtaining information to the effect that the application APP is about to invite a user of the terminal TRM to input data;
- means for accessing a binary file representative of a secret image known to the user of the terminal, this binary file being stored in a secure element of the terminal;
- means for constituting a complex image in the secure element, the complex image being obtained from the secret image and from dynamic data that is inaccessible to said terminal; and
- means for displaying the complex image on a screen of the terminal.

The invention claimed is:

1. A security method for making a computer application being executed on a terminal secure, the method being implemented by the terminal on which said computer application is being executed and comprising:
   - obtaining information indicating that said application being made secure is about to invite a user of the terminal on which said application is being executed to input data;
   - obtaining a secret image known to the user of the terminal by accessing a binary file representative of the secret image, the binary file being stored in a secure element of the terminal on which said application being made secure is being executed;
   - constituting a complex image in said secure element of the terminal on which said application being made secure is being executed, the complex image being constituted from said secret image obtained by accessing said binary file stored in the secure element of the terminal on which said application being made secure is being executed and from dynamic data that is inaccessible to said terminal on which said application being made secure is being executed; and
   - displaying said complex image on a screen of the terminal on which said application being made secure is being executed.

2. A security method according to claim 1, wherein said display is carried out before said input is confirmed.

3. A security method according to claim 1, wherein said invitation comprises displaying an application screen display including a zone for inputting said data, and wherein said display process comprises displaying an image obtained by combining, within said secure element, said application screen display with said complex image.

4. A security method according to claim 1, further including a process of prompting the user to change said secret image.

5. A security method according to claim 1, wherein said application is executed at least in part in said secure element.

6. A security method according to claim 1, wherein said dynamic data is a parameter of said application.

7. A security method according to claim 6, wherein said application is a contactless payment application and said dynamic data is the amount of a transaction.

8. A non-transitory computer readable medium having stored thereon a first computer program including instructions for executing the security method according to claim 1, when said program is executed by a processor.

9. A non-transitory computer readable medium according to claim 8, wherein said first computer program further includes instructions for executing at least a portion of said computer application when said program is executed by said processor.

10. A non-transitory computer readable medium according to claim 9 further comprising a second program, independent of said first program, the second program including instructions for executing at least a portion of said computer application when said program is executed by a processor.

11. A security device for making a computer application being executed on a terminal secure, the security device being adapted for inclusion in the terminal and comprising:
   - a component configured to obtain information indicating that said application being made secure is about to invite a user of the terminal on which said application is being executed to input data;
   - a component configured to obtain a secret image known to the user of the terminal by accessing a binary file representative of the secret image, the binary file being stored in a secure element of the terminal on which the application being made secure is being executed;
   - a component configured to constitute a complex image in said secure element of the terminal on which said application being made secure is being executed, the complex image being constituted from said secret image obtained by accessing said binary file stored in the secure element of the terminal on which said application being made secure is being executed and from dynamic data that is inaccessible to said terminal on which said application being made secure is being executed; and
   - a component configured to display said complex image on a screen of the terminal on which said application being made secure is being executed.

12. A security element including a device according to claim 11.

13. A security element according to claim 12, further including a secure domain specific to said computer application, said binary file being stored in the secure domain.

14. A terminal including a device according to claim 11.

15. A terminal according to claim 14, further including a component configured to prevent copying of the screen display of said terminal.

* * * * *